United States Patent [19]

McEachern

[11] Patent Number: 5,789,677
[45] Date of Patent: Aug. 4, 1998

[54] DUAL-AXIS FORCE FEEDBACK ACCELEROMETER

[75] Inventor: Alexander McEachern, Oakland, Calif.

[73] Assignee: Infrastructure Instruments Inc., Emeryville, Calif.

[21] Appl. No.: 769,940

[22] Filed: Dec. 19, 1996

[51] Int. Cl.⁶ ................................................ G01P 15/13
[52] U.S. Cl. ........................... 73/514.19; 73/514.17; 73/514.21
[58] Field of Search ............................ 73/514.14, 514.19, 73/514.21, 514.22, 514.23, 653, 654, 514.17, 514.24

[56] References Cited

U.S. PATENT DOCUMENTS

| 3,438,265 | 4/1969 | Davies et al. | 73/514.23 |
| 4,792,931 | 12/1988 | Nishida et al. | 73/653 |

*Primary Examiner*—John E. Chapman

[57] ABSTRACT

A force-feedback accelerometer to measure small accelerations along two or more co-planar axes. A fiber suspension of a proof mass provides mechanical sensitivity; a cylindrical cross-section on the proof mass, with orthogonal optical position sensing, reduces sensitivity to torsional accelerations. Coupling both proof mass position and proof mass velocity to the feedback force eliminates the disadvantages associated with other forms of damping.

6 Claims, 2 Drawing Sheets

DUAL-AXIS FORCE FEEDBACK ACCELEROMETER

FIELD OF INVENTION

This invention relates to electronic measuring and recording instruments, more specifically to electronic instruments for measuring and recording accelerations along two orthogonal axes.

BACKGROUND OF THE INVENTION

Certain types of structural damage to buildings can be detected by measuring lateral acceleration spectra when the buildings are exposed to wind. This technique for assessing structural damage is set out more fully in McEachern et al., U.S. Pat. No. 5,526,694. The first-named inventor of the '694 patent is the inventor of the present application.

When used for this purpose, an accelerometer is placed on a horizontal surface at or near the top of a multi-story building. This accelerometer is used to measure the building's characteristic set of acceleration spectra as it sways and vibrates in any ambient breezes; the characteristics of these spectra will be a function of the building's mass, height, and structural stiffness. By measuring these acceleration spectra before and after a traumatic event such as an earthquake, changes in the acceleration spectra can be used to indicate changes in the building's stiffness, and thus indicate hidden damage to the building's structure.

An ideal accelerometer for this purpose has several characteristics: it should measure accelerations along two lateral, orthogonal axes simultaneously; it should be sufficiently sensitive to measure accelerations of building structures in light breezes, ideally resolving accelerations of $500 \times 10^{-9}$ meters per second or less; it should be inexpensive, yet have an expected lifetime of the same order of magnitude as a steel structure, ideally 50 years or longer; it should be easy to manufacture, tolerating large mechanical variations in its manufacturing process with no mechanical adjustments required; it should tolerate both torsional accelerations and large accelerations that may occur during traumatic events, such as earthquakes and violent storms, without disrupting its ability to measure small lateral accelerations.

Accelerometers known in the art which have sufficient resolution for this purpose are generally intended for vehicle navigation systems (e.g. missile, space vehicle, and aircraft navigation). An important feature for success in vehicle navigation systems is tolerance of off-axis acceleration; but for the present purpose, such a feature is almost irrelevant, as the vertical accelerations of a building are predictably many orders of magnitude smaller than accelerations in the two lateral axes.

Force feedback accelerometers are well known in the art. In such accelerometers, sufficient force is applied to a proof mass to maintain the proof mass in a fixed position relative to the accelerometer's housing. Measuring the force necessary to maintain the position provides a reliable measurement of the acceleration to which the accelerometer is exposed.

The force in a force feedback accelerometer may be electromagnetic, as in the present invention and in prior art U.S. Pat. Nos. 3,132,521, 3,339,419, 3,513,711, 3,680,393, and 5,055,759, or it may be electrostatic, as in prior art U.S. Pat. No. 4,094,199 and other micro-machined silicon accelerometers well known in the art.

The feedback information regarding the proof mass's position may be provided optically, as in the present invention and in prior art U.S. Pat. No. 5,055,759, capacitively as in U.S. Pat. No. 4,094,199, inductively as in the Braccini reference, or by other means.

Force-feedback accelerometers generally have natural mechanical resonances, and consequently require damping. For example, pendulum-type force-feedback accelerometers such as the one disclosed in the present application resonate at a natural frequency determined by the length of the pendulum. Prior art damping techniques include magnetic vane damping such as that disclosed in the Mehta reference, inertial damping such as that disclosed in U.S. Pat. No. 3,132,521, and, more commonly, viscous damping such as that disclosed in U.S. Pat. No. 3,998,106.

Viscous damping has three well-known disadvantages in highly sensitive accelerometers: first, the viscosity of the damping fluid can change with temperature, and consequently its damping characteristics change with temperature; second, turbulence in the damping fluid can disrupt sensitive measurements; and third, construction of a mechanism that contains a fluid is necessarily more complex and expensive that that required for one without a fluid.

OBJECTS AND ADVANTAGES

It is an object of this invention to provide a small, simple, inexpensive accelerometer with sufficient sensitivity to record the wind-stimulated accelerations in multi-story buildings.

It is a further object of this invention to eliminate the disadvantages associated with viscous and permanent magnet damping, particularly those disadvantages associated with turbulence in the damping media, and those disadvantages associated with changes in damping properties as a function of temperature.

It is a further object of this invention to provide an accelerometer that is sensitive to lateral accelerations and insensitive to torsional accelerations.

It is a further object of this invention to further simplify a force-feedback accelerometer by employing a single forcing means for both the acceleration feedback force and for the damping force.

Still further objects and advantages will become apparent from a consideration of the ensuing description and accompanying drawings.

PREFERRED EMBODIMENT

Description

Figure 1:
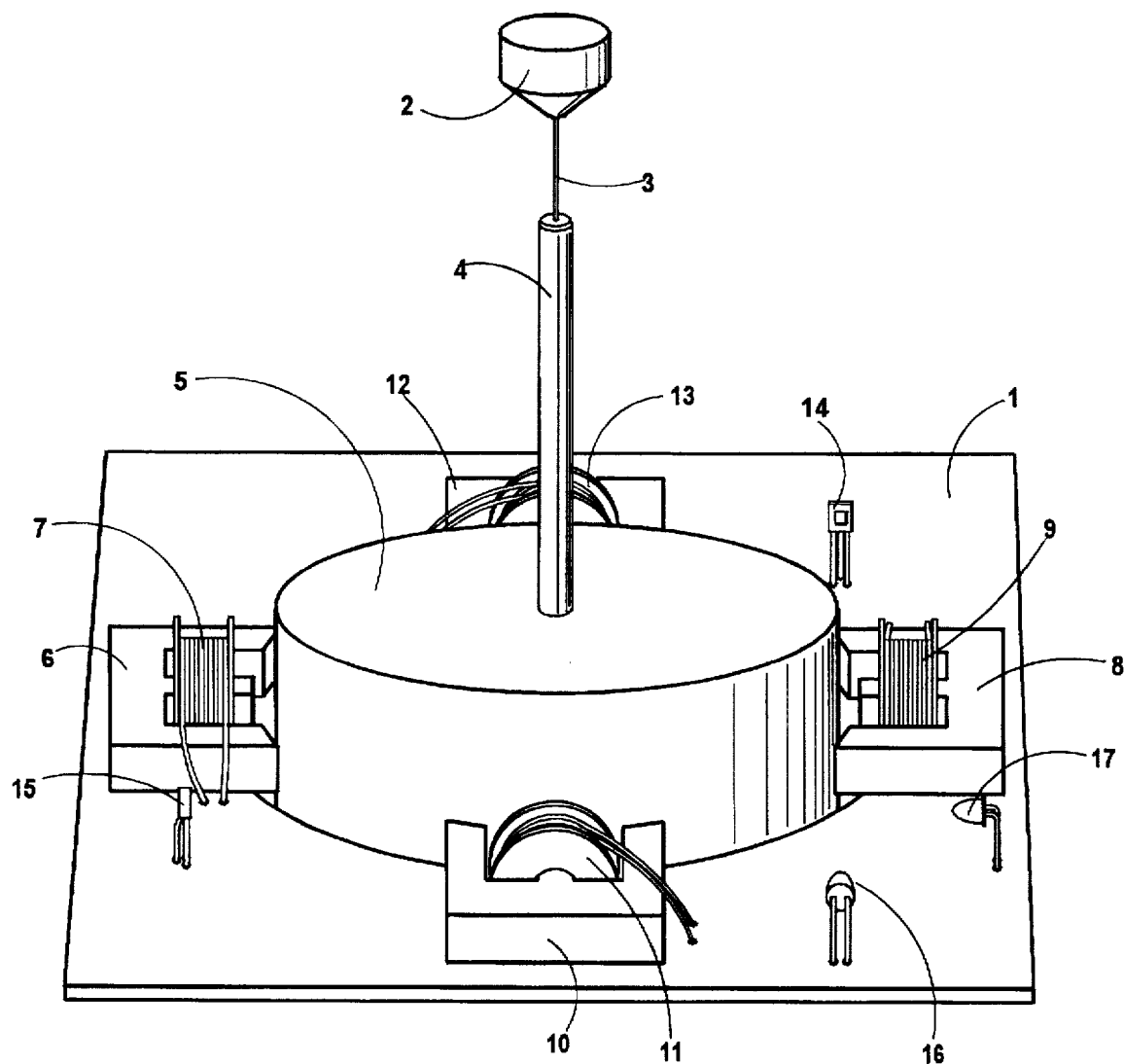
FIG. 1 is a perspective view of a preferred embodiment of the present invention.

Turning first to FIG. 1, we see a perspective view of the key elements of the present invention. A proof mass 5 and its associated support shaft 4 suspended from a fiber 3. The proof mass 5 is constructed of ferromagnetic material. The fiber 3 is in turn rigidly attached to the accelerometer housing in any convenient way known in the art, represented here by the mounting attachment 2. The form of the accelerometer housing is not critical to the present invention and has been omitted for clarity. It will be recognized by those familiar with the art that the mounting attachment 2, the fiber 3, the support shaft 4, and the proof mass 5 will have a natural vibration frequency determined in part by the pendulum characteristics of the system and in part by the spring stiffness characteristics of the fiber 3.

We also see a printed wiring board 1 which is also rigidly attached to the accelerometer housing. The proof mass 5 is suspended through a hole that penetrates the printed wiring board 1. Rigidly attached to the printed wiring board 1, surrounding the proof mass 5, at four orthogonal locations, are four 'E'-shaped ferromagnetic cores 6, 8, 10, 12. Associated with each of these cores are four magnet coils 7, 9, 11, 13. The cores are positioned in such a way that the proof mass 5 may move through a limited arc between the cores, and in such a way that current through a magnet coil 7, 9, 11, 13 will create a magnetic field that attracts the proof mass.

Continuing to inspect FIG. 1, we see an infrared light emitting diode (LED) 16 aligned with an infrared phototransistor 14, aligned in such a way that the proof mass 5 in its unaccelerated state blocks half of the light path between the LED 16 and the phototransistor 14. We also see an orthogonal light path that is functionally similar constructed from LED 17 and phototransistor 15. Electronic processing of the signals from the phototransistors 14, 15, explained more fully below in the discussion of FIG. 2, creates currents in the magnetic coils 1, 9, 11, 13.

Figure 2:
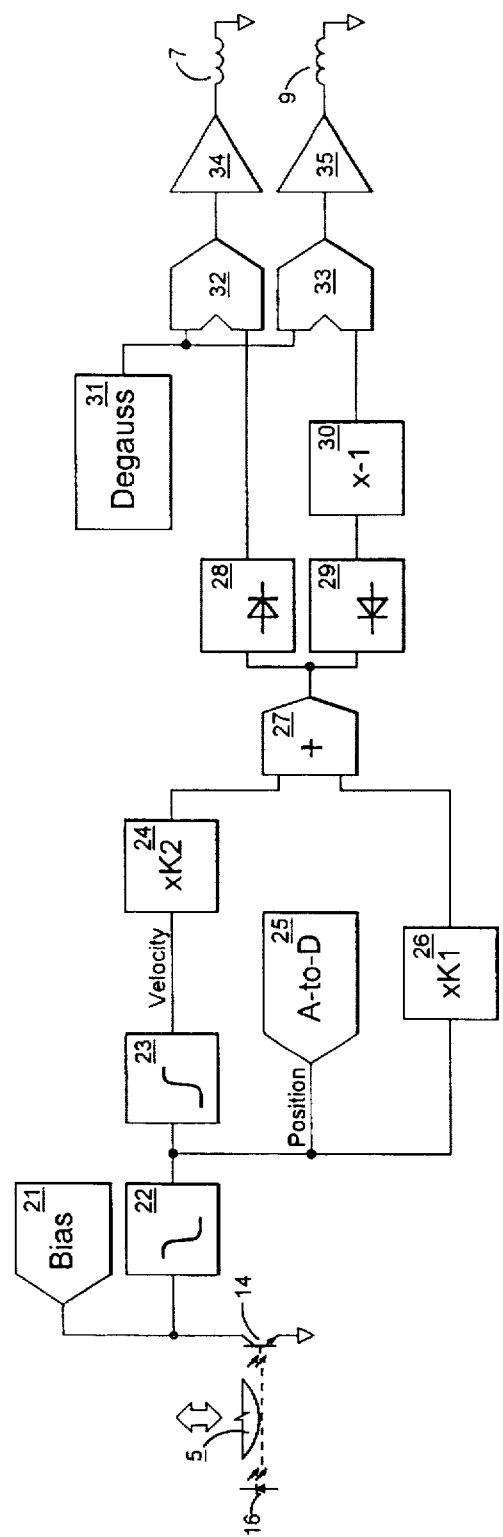
FIG. 2 shows a block diagram of the signal processing in a preferred embodiment of the present invention.

Before examining FIG. 2 in detail, we can now see from FIG. 1, in general, how the accelerometer functions. An acceleration from left to right across FIG. 1 causes the proof mass 5 to swing to the left relative to the printed wiring board 1. This partially unblocks the light path between LED 16 and phototransistor 14. The increase in light arriving at phototransistor 14 causes an increase in current in magnetic coil 9, through a process more fully described below in the discussion of FIG. 2. This increase in current, in turn, causes the core 8 to attract the proof mass 5, maintaining it in its original position. The current through coil 9 is consequently exactly proportional to the acceleration from left to right.

It will be apparent to one familiar with the art that the fiber 3 suspension of the proof mass 5 allows low-noise mechanical sensitivity to small accelerations along two axes. But further consideration of FIG. 1 will reveal that the suspension of the proof mass 5 by a fiber 3 allows the proof mass to respond by rotating in the presence of torsional accelerations, as well as displacing laterally in the presence of lateral accelerations. It is an object of the present invention to be relatively insensitive to torsional accelerations; consequently, it is critical to the present invention that the portion of the proof mass 5 that interacts with the light paths created by the LED's 16, 17 and phototransistors 14, 15 be circular in cross section, so that rotation of the proof mass 5 does not cause any change to the light paths.

Turning to FIG. 2, we see a block diagram that shows the operation of one of the two orthogonal channels of acceleration measurement. FIG. 2 shows the operation of the channel of acceleration measurement that corresponds to accelerations in FIG. 1 along an axis from the left to the right, from core 6 to core 8. A second orthogonal channel of acceleration measurement that corresponds to accelerations in FIG. 1 along an axis that runs from core 10 to core 12 is omitted from FIG. 2 to avoid redundancy, because it is substantially identical to the one shown in the Figure.

Beginning at the far left of FIG. 2, we see a schematic representation of the infrared LED 16, the proof mass 5, and the phototransistor 14, each of which can also be seen in FIG. 1. The infrared LED 16 is supplied with a constant current using any technique well known in the art, such as a single operational amplifier constant current source. The proof mass 5 partially interrupts the infrared beam from the LED 16 to the phototransistor 14. A phototransistor bias source, which may be constructed using any technique well known in the art, creates an analog voltage signal which may be thought of, initially, as being roughly proportional to the fraction of the infrared beam blocked by the proof mass 5. This analog voltage signal lies within a negative feedback loop, so this initial interpretation will be modified as we proceed further through the loop. This analog voltage signal is passed through a low-pass filter 22, which serves both as a noise reduction filter and as an anti-aliasing filter for the sampling analog-to-digital converter 25. This analog voltage signal is also passed to a gain block 26 which multiplies this signal by a constant designated as K1, and is also passed to a differentiator circuit 23. The output of the differentiator circuit 23 may be thought of as creating an analog signal that is proportional to the velocity of the proof mass 5 along the axis of interest. This analog velocity signal is passed to a gain block 24 which multiplies this signal by a constant designated as K2. The output signals from the two gain blocks 24, 26 are summed in an analog summing circuit 27. The sum signal output is passed to two precision rectifier blocks 28, 29. If the sum is positive, it passes through precision rectifier block 28; if negative, through precision rectifier block 29, then through gain block 30 where it is multiplied by a constant −1.000, converting it to a positive signal. From there, we see the signals passing through analog multiplexors 32, 33, the functions of which are discussed further below, and proceeding to voltage-to-current converters 34, 35. The current output of these converters 34, 35 are passed through magnetic coils 7, 9, which can also be seen in FIG. 1. It will be recognized by one familiar with the art that positive polarity signals at the output of the summing block 27 are steered to one coil 7, and that negative polarity signals are steered to the opposite coil 9.

Studying FIG. 2 in combination with FIG. 1, it will be apparent that the optical path formed by LED 16 and phototransistor 14 is in a negative feedback loop that flows through a filter 22, a gain block 26, force feedback generated by voltage-to-current converters 34, 35, magnetic coils 7, 9, and proof mass 5, which is in the optical path. Consequently, the output of the low-pass filter 22 is precisely proportional to the force required to maintain the proof mass 5 in its centered position, and the analog-to-digital converter 25 is in fact measuring the acceleration of the instrument housing.

Examining the differentiator 23 and associated gain block 24 in the negative feedback path reveals that together they add an additional force that is inversely proportional to the velocity of the proof mass, and consequently provide the damping function to the natural vibration frequency of the proof mass system that is, in other accelerometers in the art, provided by viscous damping or its equivalent.

It will be recognized by one familiar with the art that the invention, in its normal operating mode, applies DC current to magnetic cores 6, 8, 10, 12, and that there are advantages to occasionally applying conventional de-gaussing signals 31 to the associated coils 7, 9, 11, 13 through the analog multiplexors 32, 33. It will be recognized by one familiar with the art that well-known elements, not critical to the present invention, are present but not shown in FIG. 2, including power supplies and a microprocessor to control the analog-to-digital converter 25, to report the acceleration values, to control the degaussing procedure, and to perform other functions well known in the art.

In the preferred embodiment, the proof mass 5 and the cores 6, 8, 10, 12 are constructed of 1018 steel; the proof mass 5 is 2.00 inches in diameter and 1.00 inches thick; the support shaft 4 is 1.65 inches long; the fiber 3 is 0.020 inch diameter steel piano wire approximately 0.20 inches long; the cores 6, 8, 10, 12 are substantially 'E' shaped, with a width of 0.70 inches, a height if 0.80 inches, upper and lower legs 0.10 inches wide, a center leg 0.20 inches wide, and a thickness of 0.20 inches; the gap between each core 6, 8, 10, 12 and the proof mass 5 is nominally 0.05 inches; each coil 7, 9, 11, 13 contains 1,000 turns of 40 AWG copper wire on a nylon bobbin; the low-pass filter 22 is a 2-pole analog filter with a cut-off frequency of 20 Hz; the differentiator circuit 23 is a conventional analog differentiator with a time constant of 0.8 seconds; the analog gain constant k2 24 has a value of 2; the analog gain constant k1 26 has a value of 100; and the ratio of the voltage-to-current converters 24, 25 is one-volt-to-five-milliamps; and the analog-to-digital converter 25 can resolve 18 bits plus sign. In such an embodiment the present invention can conveniently resolve accelerations as small as $500 \times 10^{-9}$ meters per second.

PREFERRED EMBODIMENT

Operation

In operation, the invention is simply attached to a substantially horizontal surface that is not subject to vertical accelerations, and left in place. Measurements made by the analog-to-digital converter 25 associated with each of the two channels provide data regarding accelerations along two orthogonal axes parallel to the horizontal surface.

OTHER EMBODIMENTS

It will be apparent to one familiar with the art that other useful embodiments of the invention are possible.

The force applied to the proof mass by the pulling of opposite pairs of magnetic cores 6, 8 and 10, 12 could be equivalently performed by a single magnetic core pushing and pulling on a permanent magnet affixed to the proof mass by altering the current through the associated coil from positive to negative, which would eliminate the requirements for precision rectifiers 28, 29, one gain block 30, the degaussing source 31, and the analog multiplexors 32, 33. The coils may be placed on the proof mass, and may interact with ferromagnetic cores or permanent magnets that are mechanically attached to the accelerometer housing. The proof mass may be suspended above the printed wiring board, rather than protruding through it. The mechanical arrangement establishing the physical relationship between the proof mass, the magnetic coils and cores, and the optical paths may be done independently from a printed wiring board. Permanent magnets may be employed in, or as part of, the proof mass, allowing a single coil to both attract and repel the proof mass along one axis. Any, some, or all of the low-pass filter, the differentiator, the gain constant multipliers, the summing, and the rectification may be implemented digitally. The proof mass position sensing function performed optically in the preferred embodiment described above may be implemented using capacitive sensors, or other position sensing means. The damping gain block 24 may have a non-linear transfer function, such as a squared function. The damping characteristics may be configured for simple adjustment, including remote adjustment, by varying the gain of the damping path constant K2 24 or adjusting the time constant of the differentiator circuit 23 or both.

Various other modifications may be made to the preferred embodiment without departing from the spirit and scope of the invention as defined by the appended claims.

I claim:

1. An apparatus for measuring accelerations along at least two co-planar axes, comprising:
   a. an apparatus housing; and
   b. a proof mass suspension attached to the apparatus housing; and
   c. a proof mass, attached to the proof mass suspension, the proof mass capable of displacing relative to the apparatus housing along a plane defined by the coplanar axes, the proof mass having a neutral position in the plane defined by the co-planar axes, the neutral position defined by the position of the proof mass when the apparatus housing is subjected to zero acceleration along the co-planar axes, the proof mass and the proof mass suspension together having a plurality of natural vibration frequencies; and
   d. position sensing means for sensing the position of the proof mass relative to the apparatus housing along the co-planar axes; and
   e. velocity sensing means for determining the velocity of the proof mass relative to the apparatus housing along the co-planar axes; and
   f. forcing means for applying force between the apparatus housing and the proof mass along the co-planar axes; and
   g. processing means for coupling the position sensing means and the velocity sensing means to the forcing means, such processing means configured to cause the forcing means both to tend to restore the proof mass to the neutral position and to tend to damp the natural vibration frequencies; and
   h. measuring means coupled to the processing means, the measuring means determining the acceleration of the acceleration housing along the co-planar axes.

2. The invention of claim 1 in which the forcing means is electromagnetic.

3. The invention of claim 2 in which the forcing means is an electromagnet interacting with a ferromagnetic object.

4. The invention of claim 2 in which the forcing means is an electromagnet interacting with a permanent magnet.

5. The invention of claim 1 in which the position sensing means is electro-optical.

6. An apparatus for measuring accelerations along at least two co-planar axes, comprising:
   a. an apparatus housing; and
   b. a proof mass suspension fiber attached to the apparatus housing, with the axis of the fiber substantially perpendicular to a plane defined by the co-planar axes; and
   c. a proof mass, attached to the proof mass suspension fiber, the proof mass capable of displacing relative to the apparatus housing along a plane defined by the co-planar axes and capable of moving torsionally relative to the apparatus housing, the proof mass having a neutral position in the plane defined by the co-planar axes, the neutral position defined by the position of the proof mass when the apparatus housing is subjected to zero acceleration along the co-planar axes, the proof mass further having a cylindrical portion with a substantially cylindrical cross-section through an axis perpendicular to the plane defined by the co-planar axes, the proof mass and the proof mass suspension together having a plurality of natural vibration frequencies; and
   d. position sensing means for sensing the position of the cylindrical portion of the proof mass relative to the apparatus housing along the co-planar axes, the position sensing means coupled to the cylindrical portion of the proof mass, the position sensing means configured to be insensitive to torsional motion of the proof mass; and e. velocity sensing means for sensing the velocity of the cylindrical portion of the proof mass relative to the apparatus housing along the co-planar axes, the velocity sensing means coupled to the cylindrical portion of the proof mass, the velocity sensing means configured to be insensitive to torsional velocity of the proof mass; and f. forcing means for applying force between the apparatus housing and the proof mass along the coplanar axes; and g. processing means for coupling the position sensing means and the velocity sensing means to the forcing means, such processing means configured to cause the forcing means both to tend to restore the proof mass to the neutral position and to tend to damp the natural vibration frequencies; and h. measuring means coupled to the processing means, the measuring means determining the acceleration of the acceleration housing along the co-planar axes.

* * * * *